Figure 1:
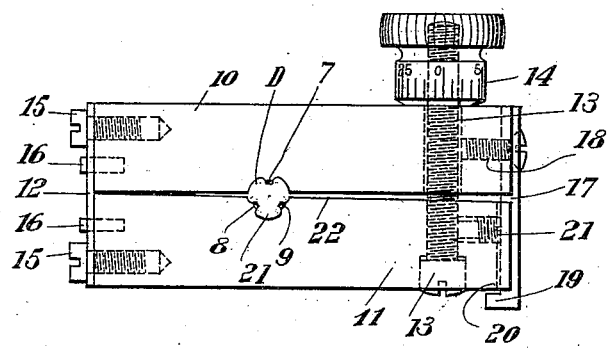

J. BARIQUAND.
LIMIT GAGE FOR SCREWS.
APPLICATION FILED SEPT. 13, 1909.

987,942.

Patented Mar. 28, 1911.

Witnesses:
H. Himsbury
E. Schallinger

Inventor:
Jules Bariquand
by B. Singer
Attorney.

UNITED STATES PATENT OFFICE.

JULES BARIQUAND, OF PARIS, FRANCE.

LIMIT-GAGE FOR SCREWS.

987,942.   Specification of Letters Patent.   Patented Mar. 28, 1911.

Application filed September 13, 1909. Serial No. 517,430.

*To all whom it may concern:*

Be it known that I, JULES BARIQUAND, a citizen of the French Republic, and resident of Paris, France, have invented certain new and useful Improvements in Limit - Gages for Screws, of which the following is a specification.

The international system of screws and nuts adopted by the congress of Zurich in conformity with the researches of the "Société d'Encouragement pour l'Industrie Nationale en France," defines the shape and the pitch of the screw threads which correspond to the various diameters of screws and establishes as a principle the general rule that the theoretical profile of the screw threaded part is a profile limited between the screw and its corresponding nut. The screw, when practically constructed for the requirements of the current mechanics, consequently must always be smaller or at the highest equal to the standard screw made according to the theoretical limit profile and on the other hand, the screw threaded nut or the tapped hole must in practice always be larger or at the least equal to the standard nut manufactured according to the same limit profile. But the screws which are currently employed in mechanical construction must, besides, fulfil another condition which is that of interchangeability.

In order to be able to be termed "interchangeable" a mechanical part or member, must have its dimensions all comprised between the maximum and minimum limits, which may be narrow or wide according to requirements and which are determined by practice in such a manner that the said member may be replaced in the mechanism of which it forms a part, by another member taken indiscriminately from the series manufactured and this without it being necessary to make any adjustment or other operation than that of simply putting the member in place.

The difference between the maximum and the minimum in the dimension of a part of manufactured and interchangeable mechanical members is called "allowance." It is needless to say that the greater the "allowances" are the more easily the members are made. But on the other hand the easiness of execution must only be taken into consideration after the conditions which are required for the good execution of the mechanisms of which the interchangeable members form a part. In order to apply these rules of the interchangeability to the screws and as the international system defines the maximum profile, it remains to define the minimum. The question is being examined by the "Société d'Encouragement" cited above. However, for carrying out these researches and also for easily applying the rules which will be given, the work shops are now wanting a commodious controlling implement for examining a manufactured screw and for ascertaining instantaneously if the dimensions of the screw threaded part of this screw are comprised in the allowance for interchangeability. It is for filling up this gap that the limit screw gage forming the subject matter of the present invention has been devised.

Figure 2:
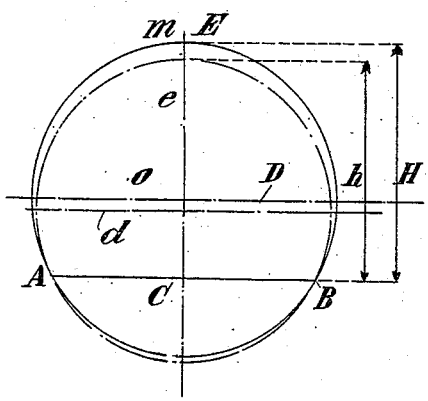
Figure 3:
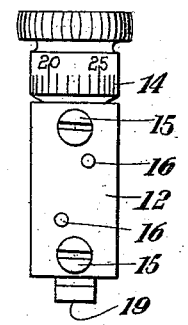

In the accompanying drawing: Figure 1 is a side elevation view of the limit screw gage; Fig. 2 shows a diagram illustrating the principle of the gage. Fig. 3 is a front elevation view of the gage.

This gage comprises two jaws 10 and 11 which are connected together at one of their ends by a hinge 12 and at the other end by means of a screw 13 on which a graduated barrel button 14 is screwed.

The hinge may be of any well known constructions for compasses such as articulation, knuckle joint, spring and so on. Reserving the use of any one of the well known systems referred to, I have shown in the example illustrated by the drawing, a connection by means of a flat spring 12 rigidly secured to each of the jaws by means of a screw 15 and of a safety pin 16.

In order to oblige the jaws to open and close correctly without turning to one side or the other (casting), a member 17, which is narrower than the jaws is provided at the end of the jaws opposite the hinge. This member or tongue 17 is secured in a groove of one of the jaws by means of the screw 18 and is adjusted with a close fit into a corresponding groove of the other jaw so as to be able to move in the latter. This member 17 carries a heel 19 which limits the opening of the jaws according to the clearance left at the point 20 and the said heel 19 of the tongue 17. In the implement thus combined, a hole has been provided between the two jaws at a point 21 of the line of contact between the said jaws. The said hole is tapped for the maximum limit profile of the screw for the diameter chosen D and this when the two jaws are as wide open as possible, the barrel knob being at zero.

It is readily understood that when the jaws are closed by means of the barrel knob screwed on the screw 13 which is rigidly connected with the jaw 11 and is locked in place by means of the set screw 21, the graduations of the barrel knob move relatively to an index engraved into the upper jaw 10 and thus give an indication of that amount by which the hole 21 in the jaws varies from the hole formed therein originally at normal position of the jaws. The possible minimum will be attained when owing to the action of the scale barrel knob the two jaws will have been applied upon each other.

As readily seen the two limit positions of the implement in an open state and the implement in a closed state can by a suitable adjusting be made to correspond to the maximum and the minimum of the allowance of the interchangeability of the screw considered.

All the screws having the nominal diameter D must first be able to be engaged in the implement when the latter is in an open state, which corresponds to the maximum limit. Those which cannot be engaged must at once be discarded. Among the screws which can be engaged in the tapped hole when the gage is open, two cases can occur for a screw tested by the gage: 1. When the scale knob is rotated, the contact between the jaws and the said screw will take place before the control limit gage be closed and, in this case, the screw will have a good interchangeability. 2. The jaws can be brought into a contact with each other without the screw being tightened in the hole 21 and in this case the screw has to be rejected as being too small.

In the drawing it is indicated that the measuring aperture D engages the screw to be gaged by means of three chasers 7, 8, 9, preferably equidistantly distributed on the inner circumference of the hole. It is obvious that the gaging circle is a circle, the periphery of which is defined by these chasers; the wall portion of the hole D between the projecting chasers may be recessed as shown. It is also obvious that a complete circular circumference may be used as a gaging aperture instead of three projecting points. In the latter case the gage would measure the length of a diameter of the inserted threaded member.

The employment of these chasers is based upon the following theoretical principle, illustrated by Fig. 2 in which D and $d$ designate the diameters of two circumferences which cut each other along a chord A B, C being the middle of A B, the line O C is perpendicular to A B. Designating the half of chord A B by K and by H and $h$ the distances of A B from the points E and $e$ respectively of the diameter through C in both circumferences, and by $m$ the difference between H and $h$, we are able to explain, the difference between the diameters $D-d=x$ as a function of $m$ D H and we have:

$$K^2 = H(D-H) = h(d-h).$$

Then replacing $h$ by $H-m$ and $d$ by $D-x$ the equation becomes $$H(D-H) = (H-m)(D-x-H+m)$$

and gives $$x = m\left(1 - \frac{D-H}{H-m}\right).$$

If one chooses for A B the chord corresponding to the side of the equi-lateral triangle inscribed in the circumference D so that $H = \frac{3}{4} D$ the equation becomes in this particular case:

$$x = m\left(1 - \frac{D}{3\,D - 4m}\right)$$

and if $m$ is very small in comparison with D we will have a great approximation by $$x = m\left(\frac{1}{3}\frac{D}{D}\right) = \frac{2}{3} m.$$

In the gage shown by Fig. 1 the tapped hole 21 has been hollowed out so as to leave in this hole three chasers 7, 8, 9 representing the theoretical limit profile of the screw thread, these three chasers being positioned at the summits of an equilateral triangle. The stationary jaw 11 contains the two chasers 8 and 9 which correspond to the points A and B of the geometrical figure (Fig. 2) while the movable jaw 10 contains the chaser 7 which corresponds to the point E so that its measured movements give the value of $m$.

By graduating in a suitable manner the scale knob 14 which graduation is made by taking into account the lever arms from the hinge to the hole 21 and to the screw of the scale knob, the pitch of this screw 13 as well as the theoretical principle explained above, the action of the operator on the scale knob will allow to read directly the value of the diameter of the screw considered.

According to the degree of sensibility which one desires to give the gage, the scale knob 14 could be provided with a frictional device of any of the well known constructions and adapted to replace the variable action of the hand by the constant action of a mechanical device.

The inventor has also devised a gage for the same use in which three chasers have been provided in at 120 degrees from each other in a ring, one of these chasers being actuated by a screw gage, but the construction of this instrument is less simple and less practical than that of the gage described above and shown by the drawing.

Having now fully described my said invention what I claim and desire to secure by Letters Patent is:—

1. In a thread gage the combination of a pair of jaws, a plate detachably fastened to said jaws and resiliently connecting said jaws at one end thereof, said jaws being provided with sections of tapped apertures which supplement each other to form a tapped circular aperture of standard size when said jaws are at a certain position with respect to each other, a micrometer screw threaded into one of said jaws and extending through both of said jaws and a nut engaging said screw, and resting against the other jaw said nut being provided with a scale for indicating the variation of said aperture from standard size.

2. In a thread gage the combination of a pair of jaws, a leaf spring connecting said jaws at one end thereof, pins extending through said leaf spring and into said jaws, said jaws being provided with sections of tapped apertures which supplement each other to form a tapped circular aperture of standard size, when said jaws are at a certain position with respect to each other, a micrometer screw secured in one of said jaws and extending loosely through the other jaw, a nut engaging said screw and said other jaw, said nut being provided with a scale for indicating the variation of said aperture from standard size.

3. In a thread gage the combination of a pair of jaws, a leaf spring connecting said jaws at one end thereof, said jaws being provided with sections of tapped apertures which supplement each other to form a circular aperture of standard size when said jaws are at a certain position with respect to each other, a micrometer screw secured in one of said jaws and loosely extending through the other jaw, a nut engaging the loose end of said screw and said other jaw and being provided with a scale for indicating the deviation of said aperture from standard size, each of said jaws being provided with a groove said grooves being in alinement with each other, a guiding member fastened to said other jaw and resting in said grooves, said member being provided with a projecting portion for limiting the distance between said jaws.

In testimony whereof I have hereunto set my hand in presence of two witnesses.

JULES BARIQUAND.

Witnesses:
H. C. COXE,
JOHN BAKER.